United States Patent
Oi et al.

(10) Patent No.: US 9,432,113 B2
(45) Date of Patent: Aug. 30, 2016

(54) OPTICAL TRANSMISSION DEVICE

(71) Applicant: FUJITSU LIMITED, Kawasaki-shi, Kanagawa (JP)

(72) Inventors: Hiroki Oi, Kawasaki (JP); Kosuke Komaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/565,500

(22) Filed: Dec. 10, 2014

(65) Prior Publication Data

US 2015/0098696 A1 Apr. 9, 2015

Related U.S. Application Data

(63) Continuation of application No. PCT/JP2012/064942, filed on Jun. 11, 2012.

(51) Int. Cl.
| | |
|---|---|
| *H04B 10/00* | (2013.01) |
| *H04J 14/00* | (2006.01) |
| *H04B 10/079* | (2013.01) |
| *H04J 14/02* | (2006.01) |
| *H04Q 11/00* | (2006.01) |

(52) U.S. Cl.
CPC ..... *H04B 10/07955* (2013.01); *H04J 14/0212* (2013.01); *H04J 14/0221* (2013.01); *H04Q 11/0003* (2013.01)

(58) Field of Classification Search
USPC .......................................................... 398/38
See application file for complete search history.

(56) References Cited

U.S. PATENT DOCUMENTS

| | | |
|---|---|---|
| 2005/0025413 A1 | 2/2005 | Takahashi et al. |
| 2006/0013585 A1* | 1/2006 | Hnatiw ..................... G01J 3/28 398/38 |
| 2006/0198583 A1* | 9/2006 | Oikawa .............. H04Q 11/0005 385/53 |
| 2007/0014513 A1* | 1/2007 | Isomura ........... H04B 10/25073 385/24 |
| 2008/0232738 A1* | 9/2008 | Yang .................... H04J 14/0206 385/24 |
| 2009/0232497 A1* | 9/2009 | Archambault ...... H04J 14/0206 398/50 |
| 2009/0297143 A1* | 12/2009 | Takeyama ........... H04J 14/0221 398/34 |
| 2010/0028007 A1* | 2/2010 | Miura .............. H04B 10/25133 398/81 |
| 2010/0129071 A1 | 5/2010 | Lin |
| 2010/0150563 A1* | 6/2010 | Nakajima ........ H04B 10/07955 398/81 |

(Continued)

FOREIGN PATENT DOCUMENTS

| | | |
|---|---|---|
| EP | 1 628 424 A2 | 2/2006 |
| EP | 2 458 763 A2 | 5/2012 |

(Continued)

OTHER PUBLICATIONS

Extended European Search Report dated Jun. 9, 2015 in corresponding European Patent Application No. 12878696.9.

(Continued)

*Primary Examiner* — Ken N Vanderpuye
*Assistant Examiner* — Amritbir Sandhu
(74) *Attorney, Agent, or Firm* — Staas & Halsey LLP

(57) ABSTRACT

An optical transmission device including a wavelength selective switch including plural output ports, an optical intensity monitoring device that receives each optical signal output from the plural output ports of the wavelength selective switch and monitors the optical intensity of the optical signals, and a controller that controls optical intensity of the optical signals from the plural output ports of the wavelength selective switch based on the optical intensities monitored by the optical intensity monitoring device.

5 Claims, 8 Drawing Sheets

(56) References Cited

U.S. PATENT DOCUMENTS

| | | | |
|---|---|---|---|
| 2010/0195183 A1 | 8/2010 | Sakai et al. | |
| 2010/0260499 A1* | 10/2010 | Izumi | H04J 14/02 398/48 |
| 2011/0008041 A1* | 1/2011 | Uchiyama | H04J 14/0212 398/30 |
| 2011/0262142 A1* | 10/2011 | Archambault | H04J 14/02 398/83 |
| 2011/0286746 A1* | 11/2011 | Ji | H04J 14/0204 398/83 |
| 2012/0155871 A1* | 6/2012 | Fukashiro | H04J 14/02 398/50 |
| 2012/0263459 A1* | 10/2012 | Komiya | H04B 10/07955 398/34 |
| 2013/0142510 A1* | 6/2013 | Zhou | H04J 14/0208 398/48 |
| 2013/0142516 A1* | 6/2013 | Zhou | H04J 14/0221 398/83 |
| 2013/0195462 A1* | 8/2013 | Ghioni | H04J 14/0219 398/83 |
| 2013/0330073 A1* | 12/2013 | Sakamoto | H04B 10/07 398/38 |
| 2014/0126903 A1* | 5/2014 | Kaneoka | H04J 14/0205 398/48 |
| 2014/0126904 A1* | 5/2014 | Testa | H04J 14/0212 398/48 |
| 2014/0139906 A1* | 5/2014 | Takeyama | H01S 3/06758 359/337.13 |
| 2014/0147121 A1* | 5/2014 | Matsukawa | H04J 14/0204 398/83 |
| 2014/0255026 A1* | 9/2014 | Roorda | H04J 14/0212 398/49 |
| 2014/0348464 A1* | 11/2014 | Kamura | H04B 10/0775 385/16 |
| 2015/0098696 A1* | 4/2015 | Oi | H04J 14/0221 398/38 |
| 2015/0147058 A1* | 5/2015 | Wellbrock | H04B 10/0799 398/48 |
| 2015/0188276 A1* | 7/2015 | Mitchell | H04J 14/0201 359/337.21 |

FOREIGN PATENT DOCUMENTS

| | | | |
|---|---|---|---|
| JP | 10-65469 | 3/1998 | |
| JP | 2003-348018 | 12/2003 | |
| JP | 2005-31576 | 2/2005 | |
| JP | EP 1628424 A2 * | 2/2006 | H04J 14/0204 |
| JP | 2009-36886 | 2/2009 | |
| JP | 2009-122492 | 6/2009 | |
| JP | 2010-217781 | 9/2010 | |
| JP | 2011-254309 | 12/2011 | |
| WO | WO 2009/069233 A1 | 6/2009 | |

OTHER PUBLICATIONS

Patent Abstracts of Japan, Publication No. 10-065469, published Mar. 6, 1998.
Patent Abstracts of Japan, Publication No. 2003-348018, published Dec. 5, 2003.
Patent Abstracts of Japan, Publication No. 2005-031576, published Feb. 3, 2005.
Patent Abstracts of Japan, Publication No. 2009-036886, published Feb. 19, 2009.
Patent Abstracts of Japan, Publication No. 2009-122492, published Jun. 4, 2009.
Patent Abstracts of Japan, Publication No. 2010-217781, published Sep. 30, 2010.
Patent Abstracts of Japan, Publication No. 2011-254309, published Dec. 15, 2011.
Gringeri et al., p. 40 of "Flexible Architectures for Optical Transport Nodes and Networks", *IEEE Communications Magazine*, Jul. 2010, 1 pp.
International Search Report mailed Sep. 18, 2012, in corresponding International Patent Application No. PCT/JP2012/064942.
Japanese Office Action for related Japanese Patent Application No. 2014-520828, issued Nov. 17, 2015, 3 pages.
Japanese Office Action dated Jun. 21, 2016 in corresponding Japanese Patent Application No. 2014-520828.

* cited by examiner

OPTICAL TRANSMISSION DEVICE

CROSS-REFERENCE TO RELATED APPLICATION

This application is a continuation application of International Application No. PCT/JP2012/064942, filed Jun. 11, 2012, the disclosure of which is incorporated herein by reference in its entirety.

FIELD

The present invention relates to an optical transmission device.

BACKGROUND

In optical transmission devices such as optical add/drop multiplexers suitably employed in an optical communication system, there is recent demand to make nodes multifunctional in order to build photonic networks. Rather than just point-to-point transmission, there is demand for functionality to freely switch an optical signal path such as optical add/drop multiplexing (OADM) and wavelength cross-connect (WXC) functionality.

There are the following 3 examples of functions being demanded from now on for optical add/drop multiplexers. One is for a colorless function, enabling freely selected wavelengths to be added/dropped. Another is a directionless function, enabling insertion (add)/splitting (drop) to a freely selected path. Yet another is a contentionless function, enabling identical wavelengths to be added/dropped without collision. These three functions (colorless, directionless, contentionless (CDC)) are expected to contribute to improving the efficiency of networks (wavelength routing), making the placement of devices more flexible (saving space by reducing device slots), and reducing cost.

RELATED NON-PATENT DOCUMENTS

S. Gringeri et al., "Flexible Architectures for Optical Transport Nodes and Networks", IEEE Communications Magazine, July 2010, p. 40.

SUMMARY

According to one aspect of technology disclosed herein, an optical transmission device is provided that includes a wavelength selective switch including plural output ports, an optical intensity monitoring device, and a controller. The optical intensity monitoring device receives optical signals output from each of the plurality of output ports of the wavelength selective switch and monitors optical intensities of the optical signals. The controller controls optical intensities of the optical signals output from the plural output ports of the wavelength selective switch, based on the optical intensities monitored by the optical intensity monitoring device.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS 1 port input/multiport output wavelength selective switches are suitably employed for optical transmission devices such as optical add/drop multiplexers that satisfy two (colorless and directionless), or three (colorless, directionless, contentionless) functions out of these functions.

The present inventors have, as a result of diligent research into optical transmission devices such as optical add/drop multiplexers employing 1-port input/multiport output wavelength selective switches (WSS), have discovered the following. In a 1-port input/multiport output wavelength selective switch, the optical power of signals output at each wavelength from the respective multiple output ports needs to be controlled to a specific value due to issues such as the input power tolerance of optical receivers and the like connected to the respective multiple output ports.

Explanation next follows regarding preferable embodiments of technology disclosed herein, with reference to the drawings.

Figure 1:
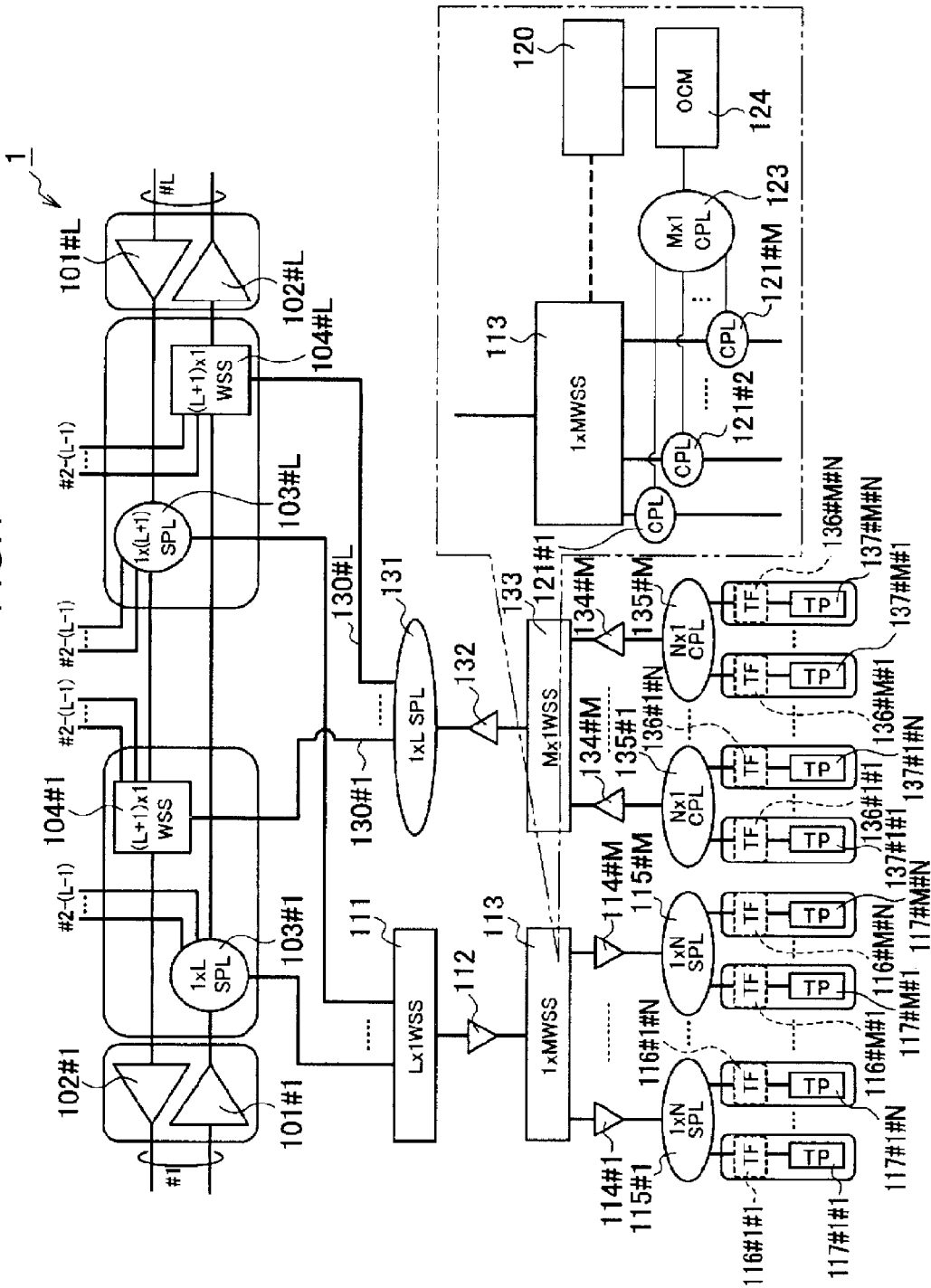
FIG. 1 is a schematic configuration diagram to explain an optical transmission node device of a first exemplary embodiment of technology disclosed herein that performs optical add/drop multiplexing.

With reference to FIG. 1, an optical transmission node device 1 of a first exemplary embodiment includes optical amplifiers 101#1 to 101#L, optical amplifiers 102#1 to 102#L, optical splitters 103#1 to 103#L, and wavelength selective switches 104#1 to 104#L. The optical transmission node device 1 also includes a wavelength selective switch 111, an optical amplifier 112, a wavelength selective switch 113, optical amplifiers 114#1 to 114#M, and splitters 115#1 to 115#M. The optical transmission node device 1 also includes transponders 117#1#1 to 117#1#N, and so on up to 117#M#1 to 117#M#N, optical couplers 121#1 to 121#M, an optical coupler 123, an optical channel monitor 124, and a control circuit 120. The optical transmission node device 1 also includes transponders 137#1#1 to 137#1#N and so on up to 137#M#1 to 137#M#N. The optical transmission node device 1 also includes optical couplers 135#1 to 135#M, optical amplifiers 134#1 to 134#M, a wavelength selective switch 133, an optical amplifier 132, and a splitter 131.

The optical transmission node device 1 employs the wavelength selective switches 104#1 to 104#L to let through (pass) or interrupt (block) optical signals transmitted from an upstream fiber transmission channel, and also transmits an inserted (added) optical signal into the next fiber transmission channel. The optical splitters 103#1 to 103#L are also employed thereby to pass optical signals transmitted from an upstream fiber transmission channel (path) and to split (drop) a portion thereof. Optical hub functionality to receive and transmit optical signals from other fiber transmission channels (#2 to # (L−1)) is also included.

For example, a maximum N×M wavelength multiplexed optical signal transmitted from the fiber transmission channel #1 is amplified by the optical amplifier 101#1, and power split by the 1-port input/(L+1)-port output optical splitter 103#1 into (L+1) individual paths. Out of the optical signals power split into (L+1) individual paths, one is employed in a loop, and another is transmitted to the (L+1)-port input/1-port output wavelength selective switch 104#L employed by the fiber transmission channel #L. The other (L−2) individual optical signals are transmitted to the (L+1)-port input/1-port output wavelength selective switch (not illustrated in the drawings) employed by the fiber transmission channels #2 to #(L−1). The remaining one optical signal is transmitted to the L-port input/1-port output wavelength selective switch 111.

Similarly, a maximum N×M wavelength multiplexed optical signal transmitted from the fiber transmission channel #L is amplified by the optical amplifier 101#L, power split by the 1-port input/(L+1)-port output optical splitter 103#L into (L+1) individual paths. Out of the optical signals power split into (L+1) individual paths, one is employed in a loop, and another is transmitted to the (L+1)-port input/1-port output wavelength selective switch 104#1 employed by the fiber transmission channel #1. The other (L−2) individual optical signals are transmitted to the (L+1)-port input/1-port output wavelength selective switch (not illustrated in the drawings) employed by the fiber transmission channels #2 to #(L−1). The remaining one optical signal is transmitted to the L-port input/1-port output wavelength selective switch 111.

Similarly, a maximum N×M wavelength multiplexed optical signal transmitted from one fiber transmission channel out of the fiber transmission channels #2 to #(L−1) is amplified by an optical amplifier (not illustrated in the drawings). The maximum N×M wavelength multiplexed optical signal is then power split by a 1-port input/(L+1)-port output optical splitter (not illustrated in the drawings) into (L+1) individual paths. Out of the optical signals power split into (L+1) individual paths, one is employed in a loop, and another is transmitted to the (L+1)-port input/1-port output wavelength selective switch 104#1 employed by the fiber transmission channel #1. Yet another is transmitted to the (L+1)-port input/1-port output wavelength selective switch 104#L employed by the fiber transmission channel #L. The other (L−3) individual optical signals are transmitted to any one of the (L+1)-port input/1-port output wavelength selective switch (not illustrated in the drawings) employed by the fiber transmission channels #2 to #(L−1) other than the freely selected fiber transmission channel. The remaining one optical signal is transmitted to the L-port input/1-port output wavelength selective switch 111.

Out of the optical signals input to the wavelength selective switch 111 from the optical splitters 103#1 to 103#L, a maximum N×M wavelength multiplexed optical signal input from a freely selected one of the optical splitters 103#1 to 103#L is selectively output by the wavelength selective switch 111.

The maximum N×M wavelength multiplexed optical signal output from the wavelength selective switch 111 is input to the optical amplifier 112 and amplified by the optical amplifier 112.

The optical signal amplified by the optical amplifier 112 is input to the 1-port input/M-port output wavelength selective switch 113. The maximum N×M wavelength multiplexed optical signal input to the wavelength selective switch 113 is output by the wavelength selective switch 113 as M individual optical signals according to the wavelength (each maximum N wavelength multiplexed). However, the optical signal of each of the wavelengths for the M individual output ports of the wavelength selective switch 113 is only output from one of the output ports, and the same wavelength optical signal is not output from different output ports.

The M individual optical signals output from the wavelength selective switch 113 are respectively input to the optical amplifiers 114#1 to 114#M, and amplified by each of the optical amplifiers 114#1 to 114#M.

The M individual optical signals amplified by each of the optical amplifiers 114#1 to 114#M are respectively input to each of the 1-port input/N-port output splitters (SPL) 115#1 to 115#M.

The M individual optical signals respectively input to the splitters 115#1 to 115#M (each maximum N wavelength multiplexed) are each split by each of the splitters 115#1 to 115#M into N individual optical signals.

The N individual optical signals split by the splitters 115#1 to 115#M are respectively input to each of the N individual transponders (TP) 117#1#1 to 117#1#N, and so on up to 117#M#1 to 117#M#N. Note that the transponders 117#1#1 to 117#1#N, and so on up to 117#M#1 to 117#M#N are tunable transponders able to correspond to freely selected wavelengths. Thus the transponders 117#1#1 to 117#1#N , and so on up to 117#M#1 to 117#M#N are capable of corresponding to optical signals with the freely selected wavelengths from out of the N individual maximum N wavelength multiplexed optical signals split by the splitters 115#1 to 115#M. Tunable filters (TF) 116#1#1 to 116#1#N and so on up to 116#M#1 to 116#M#N may also be respectively inserted between the splitters 115#1 to 115#M and the transponders 117#1#1 to 117#1#N and so on up to transponders 117#M#1 to 117#M#N. The tunable filters 116#1#1 to 116#1#N and so on up to 116#M#1 to 116#M#N are capable of extracting an optical signal of a freely selected wavelength from out of the maximum N wavelength multiplexed optical signals output from the splitters 115#1 to 115#M.

The wavelength selective switch is a device capable of switching paths for each wavelength, and freely selecting a path for a freely selected wavelength. The wavelength selective switch is capable of exclusively transmitting the required optical signal arriving from plural paths, and of blocking the others. For example, the L-port input/1-port output wavelength selective switch 111 is capable of selecting and outputting an optical signal arriving from a freely selected path out of the optical signals arriving from L individual paths, and blocking the optical signals that have arrived from the other paths. The wavelength selective switch can perform path selection in this manner for each of the wavelengths. For example, the 1-port input/M-port output wavelength selective switch 113 is capable of outputting an optical signal of a freely selected wavelength out of the input optical signals to a freely selected path out of the M individual paths.

Thus the drop side of the optical transmission node device 1 is capable of dropping an optical signal arriving from a freely selected fiber transmission channel out of the maximum N×M wavelength multiplexed optical signals arriving from the respective fiber transmission channels #1 to #L, onto a freely selected transponder (directionless), and is capable of dropping an optical signal of a freely selected wavelength onto a freely selected transponder (colorless).

In addition to the path switching functionality as described above, the wavelength selective switch includes a function capable of regulating the power of the switched optical signal. In the present exemplary embodiment, an optical signal power regulation function is employed to regulate the power of the optical signal output from the wavelength selective switch 113 to within a specific range.

In the present exemplary embodiment, optical couplers 121#1 to 121#M are respectively inserted between the 1-port input/M-port output wavelength selective switch 113 and the optical amplifiers 114#1 to 114#M. A portion of the optical signal output from the wavelength selective switch 113 is split by the optical couplers 121#1 to 121#M, and then the split optical signals are coupled by the M-port input/1-port output optical coupler 123. The optical power of each of the wavelengths of the optical signal after coupling is detected by the single optical channel monitor (OCM) 124. Based on the detection signal of the optical channel monitor 124, feedback control is performed by the control circuit 120 on a variable attenuation amount in the wavelength selective switch 113 such that the signal optical power of each of the wavelengths becomes a desired value. The optical power regulation of optical signals is required to suppress power variation between wavelengths so as to fall within the input power tolerance ranges of optical receivers such as transponders. Configuration including the optical coupler 123 and the optical channel monitor 124 is an example of an optical intensity monitoring device.

The optical signals split by the optical couplers 121#1 to 121#M are coupled by the optical coupler 123, and optical power is detected by the single optical channel monitor (OCM) 124 for each of the wavelengths of the optical signals after coupling. As a result, a single optical channel monitor 124 suffices.

As described above, the optical signals of each of the wavelengths are only output from a single output port for the M individual output ports of the wavelength selective switch 113, and so the same wavelength optical signal is not output from different output ports. Thus even though the optical signals split by the optical couplers 121#1 to 121#M are coupled by the M-port input/1-port output optical coupler 123, there is no overlap, or interference, between light of the same wavelength. This thereby enables optical power for each of the wavelengths of optical signal coupled by the M-port input/1-port output optical coupler 123 to be detected by the single optical channel monitor 124. As a result, the single optical channel monitor 124 suffices, enabling a reduction in cost to be achieved. There is also no optical switching or the like employed, enabling output from multiple ports to be monitored at high speed.

Figure 2:
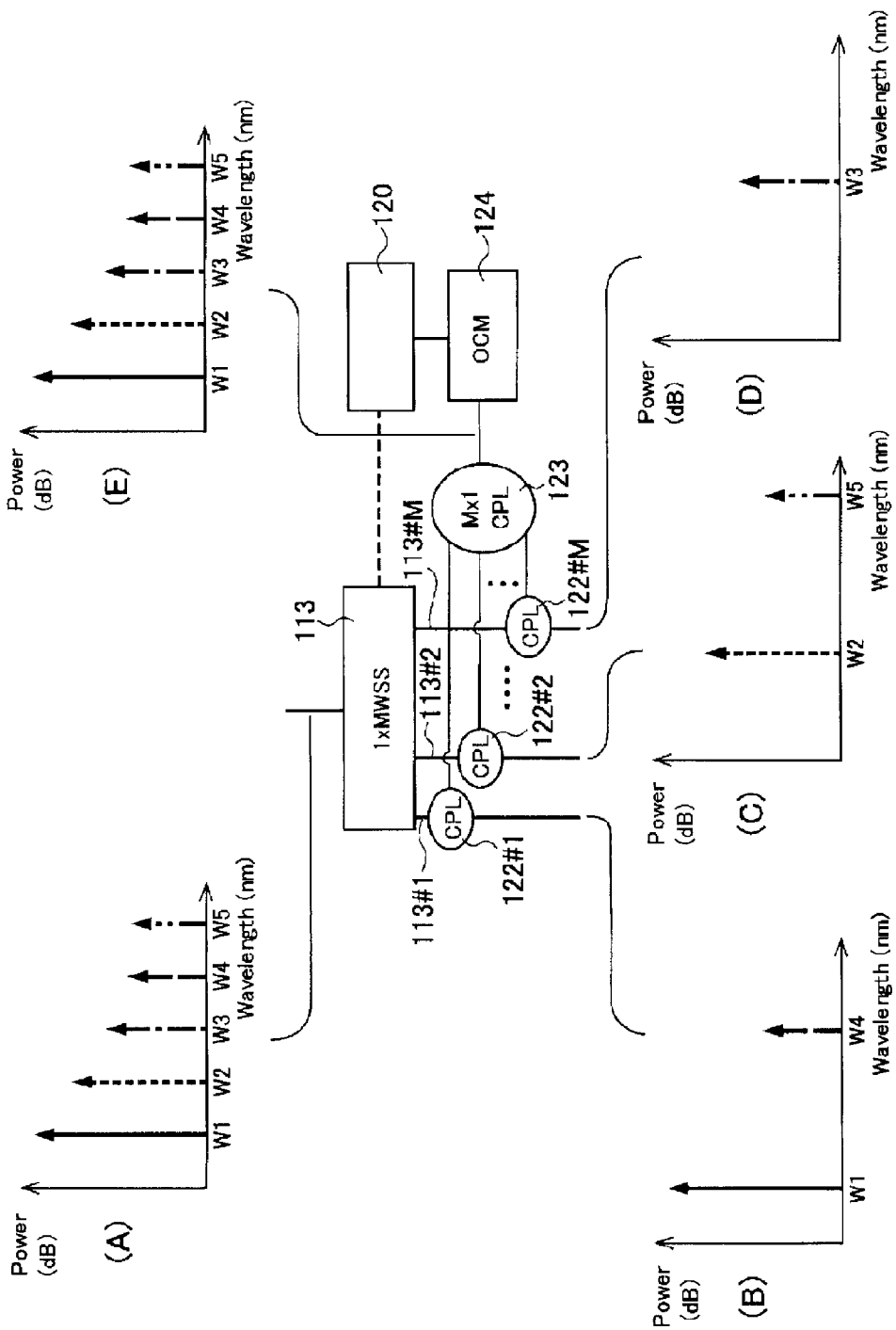
FIG. 2 is an explanatory diagram of an optical signal output from a wavelength selective switch.

With reference to FIG. 2, consider a case, for example, in which a multiplex optical signal A of 5 wavelengths (W1, W2, W3, W4, W5) is input to the wavelength selective switch 113. Out of the 5 wavelengths, 2 wavelengths (W1, W4) configure an optical signal B output from the output port 113#1, 2 wavelengths (W2, W5) configure an optical signal C output from the output port 113#2, and 1 wavelength (W3) configures an optical signal D output from the output port 113#M. The optical signal B is split by an optical coupler 122#1, the optical signal C is split by an optical coupler 122#2, and the optical signal D is split by an optical coupler 122#M, and are respectively coupled by the optical coupler 123 into a 5 wavelength (W1, W2, W3, W4, W5) multiplexed optical signal E. Thus since the optical signals of each of the wavelengths are only output from a single output port out of the M individual output ports of the wavelength selective switch 113, there is no overlap, or interference, between light of the same wavelength, even when coupled by the optical coupler 123.

Explanation next follows regarding configuration of the add side of the optical transmission node device 1.

The transponders 137#1#1 to 137#1#N and so on up to 137#M#1 to 137#M#N are tunable transponders, and are able to correspond to freely selected wavelengths. Thus optical signals of a maximum of N×M different individual wavelengths can be output. The optical signals with a maximum of N×M different individual wavelengths output from the transponders 137#1#1 to 137#1#N and so on up to 137#M#1 to 137#M#N are input to the N-port input/1-port output optical couplers 135#1 to 135#M.

Every 1 individual optical coupler out of the optical couplers 135#1 to 135#M is connected to all of N individual transponders out of the transponders 137#1#1 to 137#1#N and so on up to 137#M#1 to 137#M#N. For example, optical signals output from the N individual transponders 137#1#1 to 137#1#N are input to optical coupler 135#1, so as to give a maximum N wavelength multiplexed optical signal coupled by the optical coupler 135#1. Moreover, for example, optical signals output from the N individual transponders 137#M#1 to 137#M#N are input to the optical coupler 135#M, and coupled by the optical coupler 135#M to give a maximum N wavelength multiplexed optical signal.

Each of tunable filters 136#1#1 to 136#1#N and so on up to 136#M #1 to 136#M#N may be respectively inserted between the transponders 137#1#1 to 137#1#N and so on up to 137#M#1 to 137#M#N, and the optical couplers 135#1 to 135#M. The tunable filters 136#1#1 to 136#1#N and so on up to 136#M #1 to 136#M#N narrow the bandwidth of the optical signals output from the transponders 137#1#1 to 137#1#N and so on up to 137#M#1 to 137#M#N.

The maximum N wavelength multiplexed optical signals respectively output from each of the M individual optical couplers 135#1 to 135#M are input to the optical amplifiers 134#1 to 134#M and amplified by the optical amplifiers 34#1 to 134#M.

The M individual optical signals amplified by each of the optical amplifiers 134#1 to 134#M are input to the M-port input/1-port output wavelength selective switch 133, so as to be coupled by the wavelength selective switch 133 and become a maximum N×M wavelength multiplexed optical signal.

The optical signal coupled by the wavelength selective switch 133 is input to the optical amplifier 132, and amplified by the optical amplifier 132.

The maximum N×M wavelength multiplexed optical signal amplified by the optical amplifier 132 is input to the 1-port input/L-port output splitter 131, and split by the splitter 131 into L individual optical signals.

The maximum N×M wavelength multiplexed optical signal split into L individual optical signals by the splitter 131 are respectively transmitted to the (L+1)-port input/1-port output wavelength selective switches 104#1 to 104#L.

For example, the wavelength selective switch 104#1 is input with the maximum N×M wavelength multiplexed optical signals respectively arriving from the fiber transmission channels #2 to L, and with the maximum N×M wavelength multiplexed optical signal split by the splitter 131 and output from the output port 130#1. Out of the L individual maximum N×M wavelength multiplexed optical signals respectively input, one maximum N×M wavelength multiplexed optical signal is selected by the wavelength selective switch 104#1, input to the optical amplifier 102#1, amplified by the optical amplifier 102#1, and output to the fiber transmission channel 1.

For example, the wavelength selective switch 104#L is input with the maximum N×M wavelength multiplexed optical signals respectively arriving from the fiber transmission channels #1 to (L−1), and with the maximum N×M wavelength multiplexed optical signal split by the splitter 131 and output from the output port 130#L. Out of the L individual maximum N×M wavelength multiplexed optical signals respectively input, one maximum N×M wavelength multiplexed optical signal is selected by the wavelength selective switch 104#L, input to the optical amplifier 102#L, amplified by the optical amplifier 102#L, and output to the fiber transmission channel L.

Similarly, maximum N×M wavelength multiplexed optical signals are also output to the other fiber transmission channels 2 to (L−1).

Figure 3:
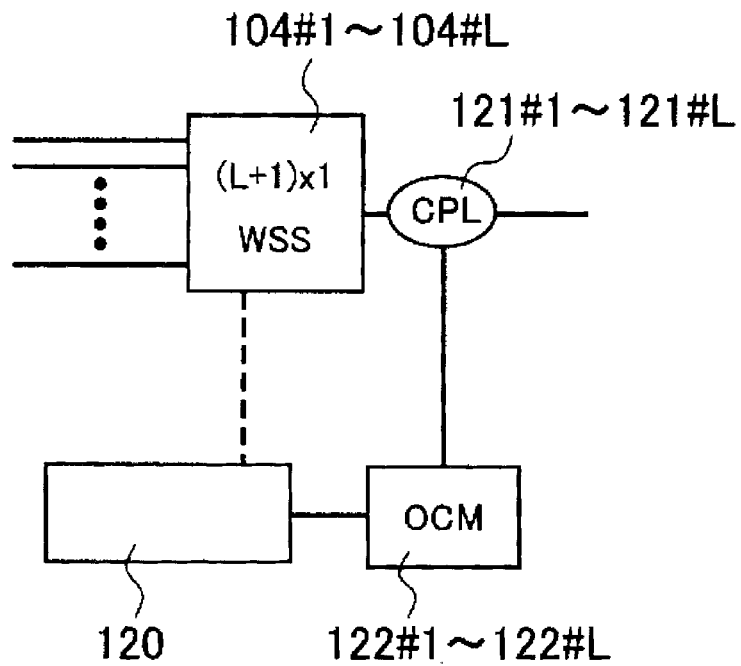
FIG. 3 is an explanatory diagram of optical power regulation in an optical signal output from a wavelength selective switch.
Figure 4:
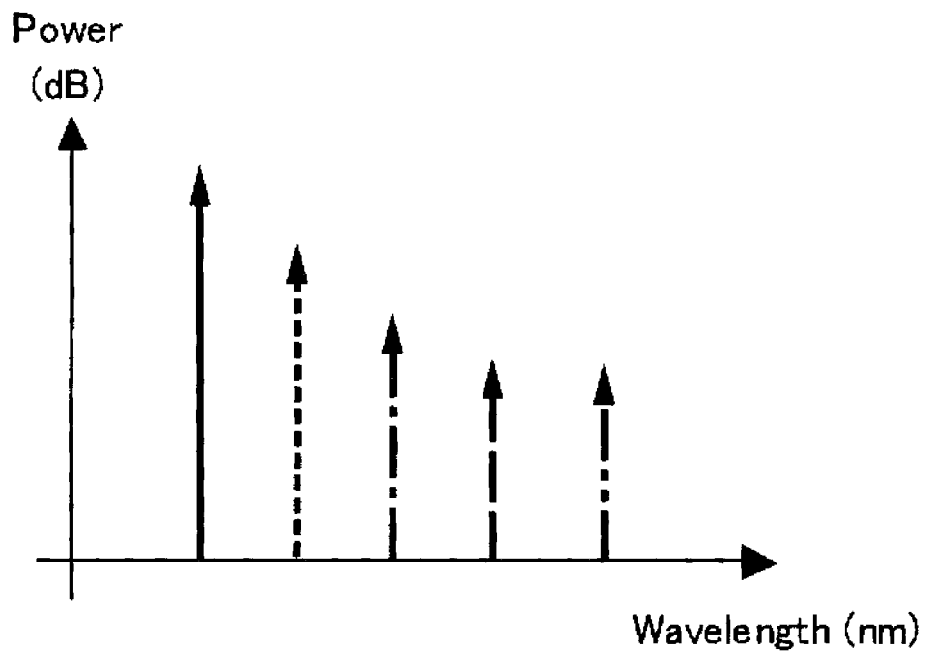
FIG. 4 is an explanatory diagram of an optical signal output from a wavelength selective switch.
Figure 5:
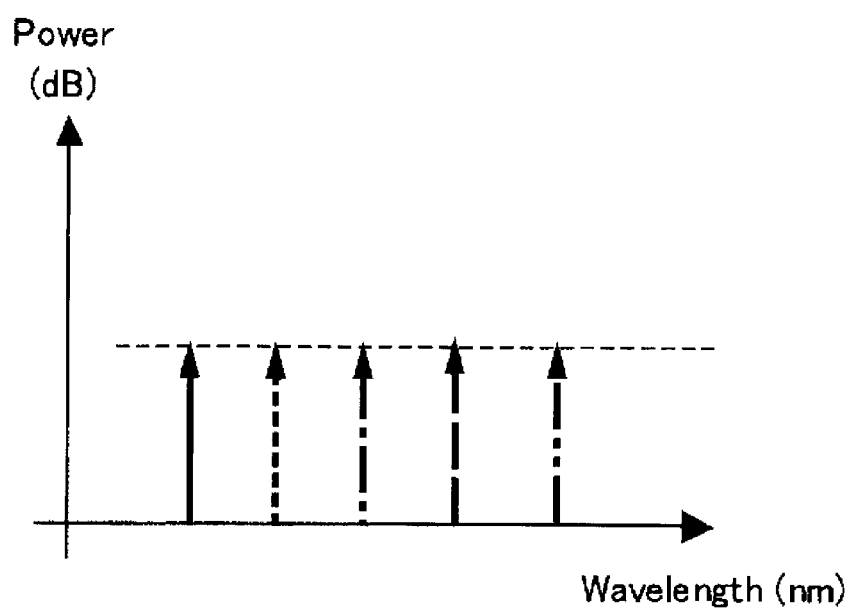
FIG. 5 is an explanatory diagram of an optical signal output from a wavelength selective switch after optical power regulation.

Note that, as illustrated in FIG. 3, the optical couplers 121#1 to 121#L are each used to split a portion of the optical signals of the respective output ports of the (L+1)-port input/1-port output wavelength selective switches 104#1 to 104#L. The optical signal power of each of the wavelengths of the optical signals split by the optical couplers 121#1 to 121#L are respectively detected by the optical channel monitors 122#1 to 122#L (see FIG. 4). The detected optical signal powers for each of the wavelengths are employed to perform feedback control on the variable attenuation amounts in the wavelength selective switches 104#1 to 104#L using the control circuit 120 such that the optical signal power of each of the wavelengths becomes a desired value (see FIG. 5).

Making the signal power variance between wavelengths input to the fiber transmission channels smaller enables signal deterioration due to fiber non-linearity effects (signal distortion arising at high optical power) and deterioration in optical signal band noise ratio (deterioration arising at low optical power), to be suppressed.

At the add side of the optical transmission node device 1, the couplers 135#1 to 135#M and the wavelength selective switch 133 are employed, and only devices that add power to optical signals are employed. Other than these, only the optical amplifiers 134#1 to 134#M and the optical amplifier 132 are employed, and no wavelength limiting devices are employed. Consequently, as long as the wavelengths are different from each other, it is possible to add an optical signal of a freely selected wavelength to a freely selected transponder 137#1#1 to 137#1#N and so on up to 137#M#1 to 137#M#N (colorless). Moreover, it is possible to transmit the optical signal from a freely selected transponder 137#1#1 to 137#1#N and so on up to 137#M#1 to 137#M#N to a freely selected fiber transmission channel (directionless).

Figure 6:
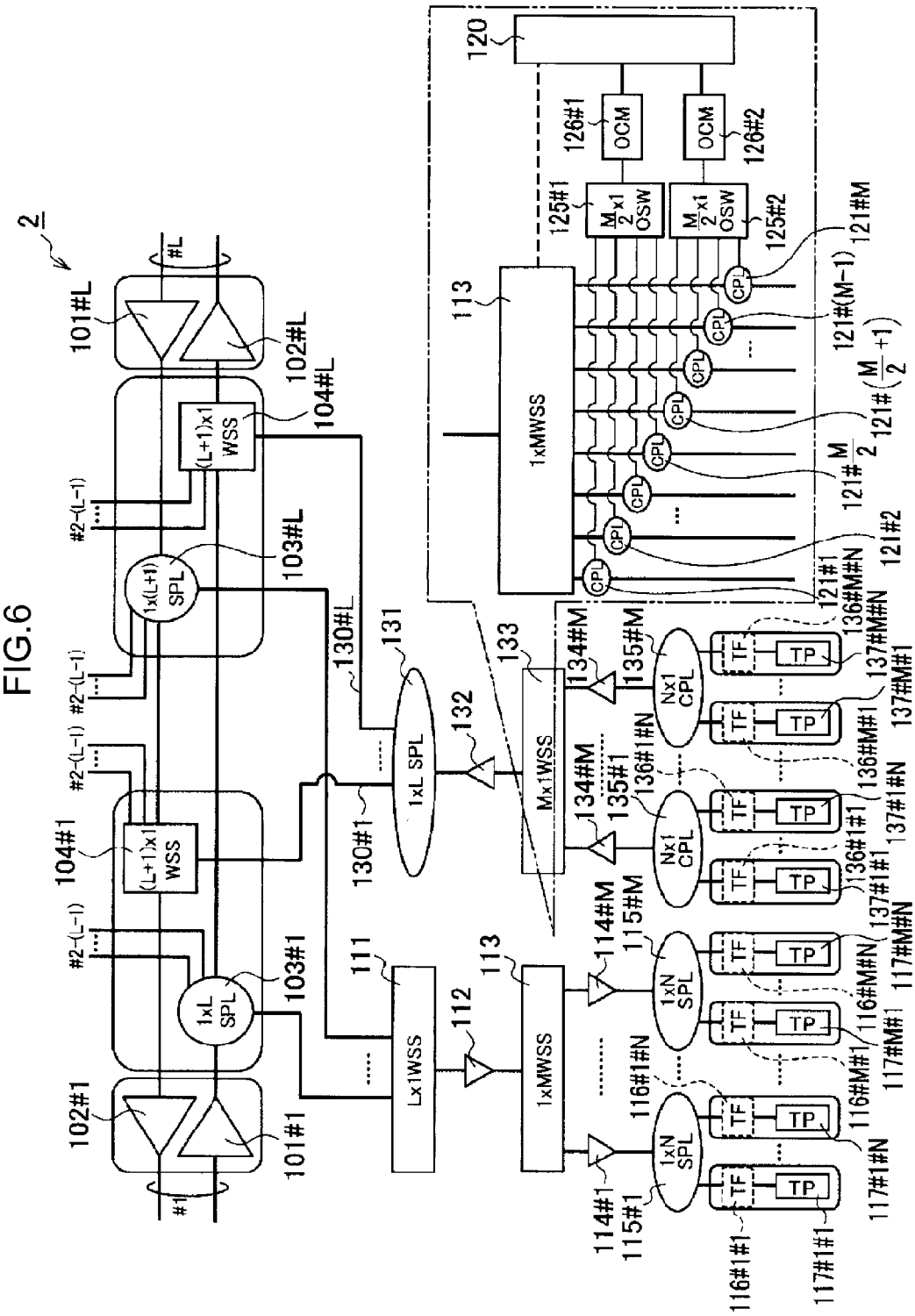
FIG. 6 is a schematic configuration diagram to explain an optical transmission node device of a second exemplary embodiment of technology disclosed herein.

With reference to FIG. 6, in a second exemplary embodiment, optical couplers 121#1 to 121#M each split a portion of the optical signals output from each of the output ports of a 1-port input/M-port output wavelength selective switch 113. A multiport input (for example 2-port input or 4-port input)/1-port output optical switch (OSW) is employed to switch the optical signals output from the optical couplers 121#1 to 121#M for each appropriate number of output ports. The optical switch here includes a function to switch the input port connected to the output port in sequence at high speed for the plural input ports.

In the present exemplary embodiment, 2 individual (M/2)-port input/1-port output optical switches 125#1, 125#2 are employed for the M individual optical couplers 121#1 to 121#M. Optical channel monitors 126#1, 126#2 are disposed so as to correspond to the optical switches 125#1, 125#2. The optical signals output from the optical couplers 121#1 to 121#(M/2) are input to the optical switch 125#1. The optical signals output from the optical couplers 121#1 to 121#(M/2) are switched by the optical switch 125#1, and input in sequence to the optical channel monitor 126#1. The optical signals output from the optical couplers 121#(M/2+1) to 121#M are input to the optical switch 125#2. The optical signals output from the optical couplers 121#(M/2+1) to 121#M are switched by the optical switch 125#2, and input in sequence to the optical channel monitor 126#2.

The optical signal power is detected in sequence for each of the wavelengths with the optical channel monitors 126#1, 126#2. The optical signal power detected for each of the wavelengths is employed for feedback-control by the control circuit 120 on the variable attenuation amount in the wavelength selective switch 113 such that the optical signal power of each of the wavelengths is a desired value.

In the present exemplary embodiment, the optical signals output from the output ports of the 1-port input/M-port output wavelength selective switch 113 are sequentially switched by the optical switches 125#1, 2, and input in sequence to the 1-port input optical channel monitors 126#1, 126#2. Consequently, the present exemplary embodiment has the advantage that, compared to the configuration of the first exemplary embodiment, it is less liable to be affected by variation in optical loss between the output ports of the 1-port input/M-port output wavelength selective switch 113. Note that configuration including the optical switches 125#1, 2 and the optical channel monitors 126#1, 126#2 is an example of an optical intensity monitoring device.

In the present exemplary embodiment, the 1-port input optical channel monitors 126#1, 126#2 are respectively disposed for the 2 individual (M/2)-port input/1-port output optical switches 125#1, 125#2. In contrast thereto, configurations with a reduced number of optical channel monitors are conceivable using 2-port input or 4-port input optical channel monitors.

Figure 7:
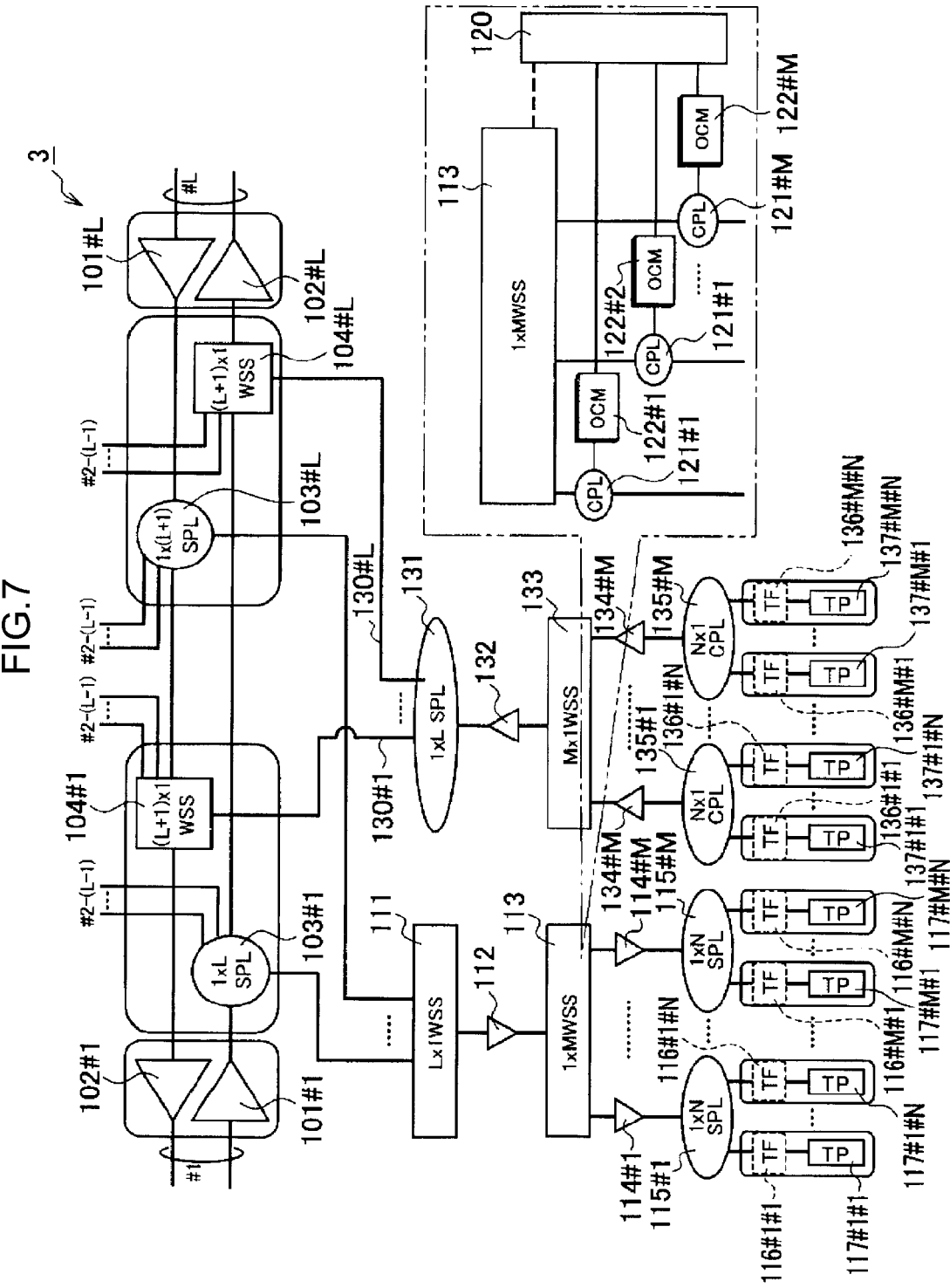
FIG. 7 is a schematic configuration diagram to explain an optical transmission node device of a third exemplary embodiment of technology disclosed herein.

With reference to FIG. 7, in a third exemplary embodiment, optical couplers 121#1 to 121#M each split a portion of the optical signals output from each of the output ports of the 1-port input/M-port output wavelength selective switch 113. The M individual split optical signals are respectively input to M individual optical channel monitors 122#1 to 122#M, and the optical power of each of the channels of the optical signal is detected by the optical channel monitors 122#1 to 122#M. Based on these detection signals, the variable attenuation amount in the wavelength selective switch 113 is feedback-controlled by a control circuit 120 such that the optical signal power of each of the wavelengths becomes a desired value. Due to regulating the optical power of the optical signals, the power variance between the wavelengths is suppressed so as to fall within an input power tolerance range for an optical receiver. The optical channel monitors 122#1 to 122#M are an example of an optical intensity monitoring device.

Figure 8:
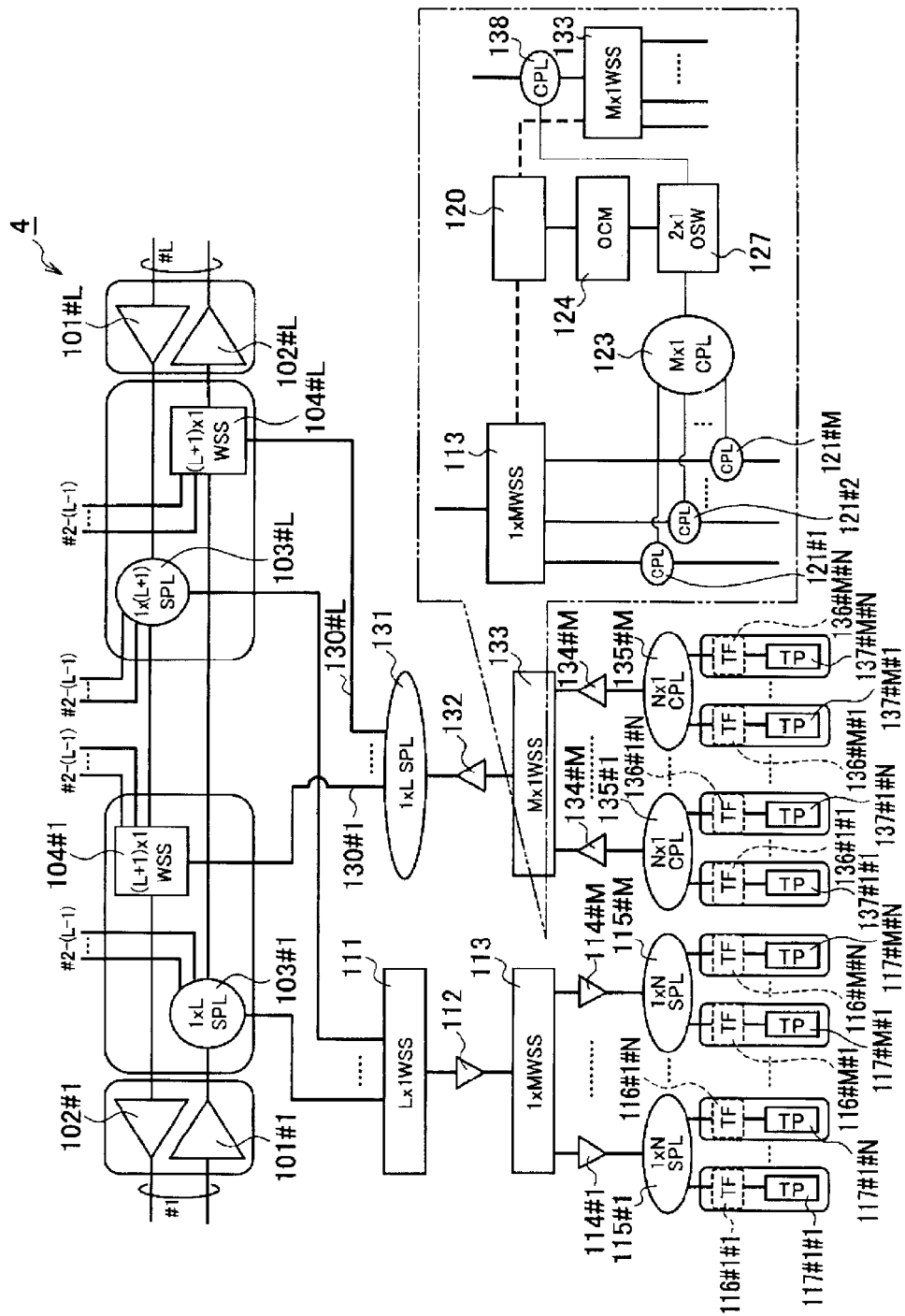
FIG. 8 is a schematic configuration diagram to explain an optical transmission node device of a fourth exemplary embodiment of technology disclosed herein.

With reference to FIG. 8, optical signals output from each of the output ports of the 1-port input/M-port output wavelength selective switch 113 disposed on the drop side, and the M-port input/1-port output wavelength selective switch 133 disposed on the add side are detected by the single optical channel monitor 124.

In fourth exemplary embodiment, a monitor configuration of the 1-port input/M-port output wavelength selective switch 113 on the drop side employs a configuration similar to that of the first exemplary embodiment explained with reference to FIG. 1. Note that it is possible to employ the configuration of the second exemplary embodiment explained with reference to FIG. 6, or the configuration of the third exemplary embodiment explained with reference to FIG. 7, in place of such configuration. However, a multiport input (2 ports in the present exemplary embodiment)/1-port output optical switch 127 is inserted just in front of the optical channel monitor 124.

A portion of the optical signal output from the output of the M-port input/1-port output wavelength selective switch 133 on the add side is split by an optical coupler 138. The split optical signal is input to the optical switch 127.

By using the optical switch 127 to switch the monitor signal on the add side and the monitor signal on the drop side in sequence at high speed, the optical power of each of the channels of the add and drop optical signals are detected with the single optical channel monitor 124. Then, based on the detected signals, feedback-control is performed by the control circuit 120 on the variable attenuation amount in the wavelength selective switch 113 and the wavelength selective switch 133 such that the optical signal power of each of the wavelengths becomes a desired value. Due to regulating the optical power of the optical signal output from the wavelength selective switch 113, the power variation between the wavelengths is suppressed so as to fall within the input power tolerance range of an optical receiver. The variation in signal power between the wavelengths input to fiber transmission channels is made smaller by regulating the optical power of the optical signal output from the wavelength selective switch 133. This thereby enables signal deterioration due to fiber non-linearity effects (signal distortion arising at high optical power) and deterioration in optical signal band noise ratio (deterioration arising at low optical power) to be suppressed. Note that configuration including the optical coupler 123, the optical channel monitor 124, and the optical switch 127 is an example of an optical intensity monitoring device.

Figure 9:
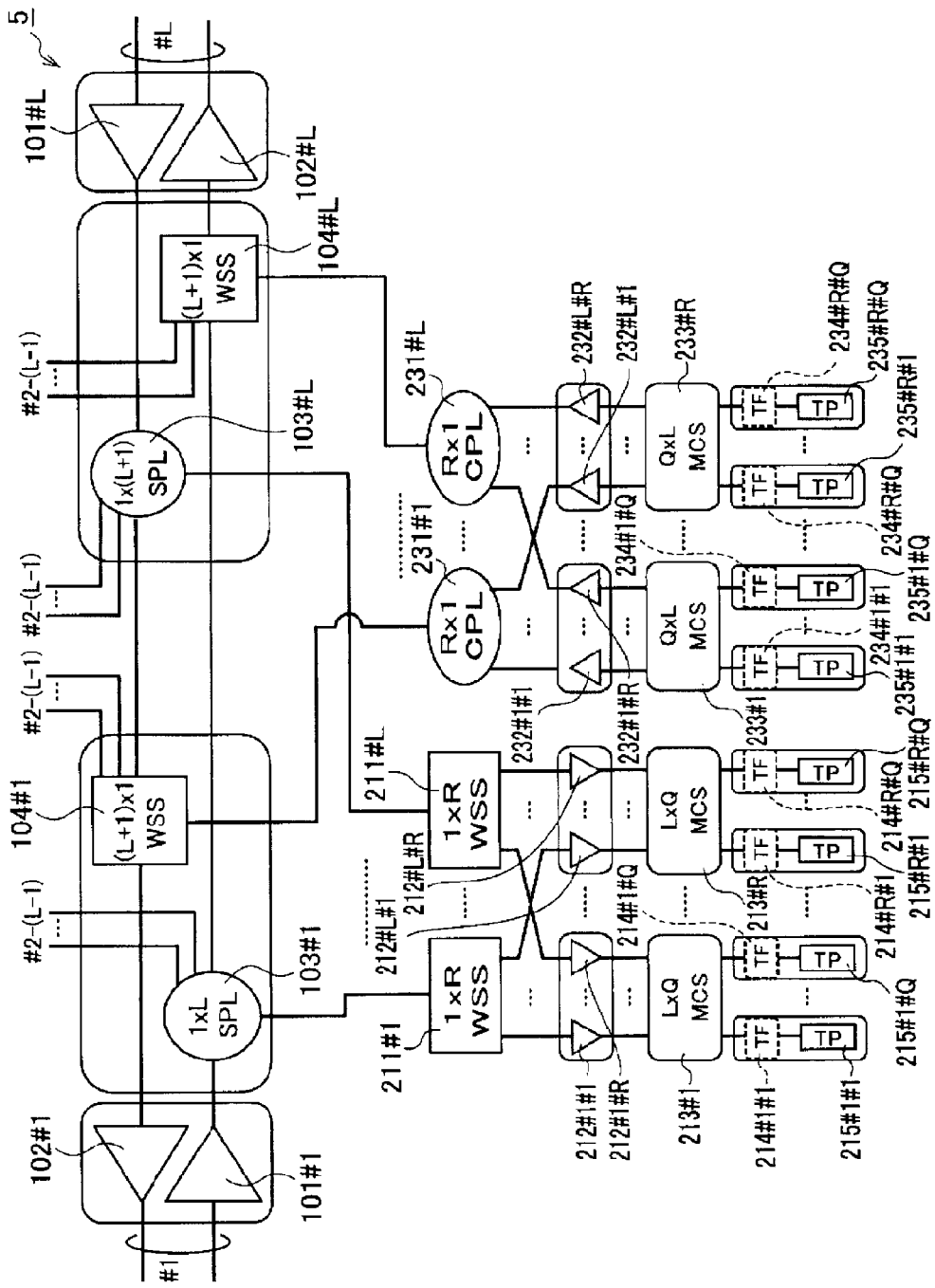
FIG. 9 is a schematic configuration diagram to explain an optical transmission node device of a fifth exemplary embodiment of technology disclosed herein.

With reference to FIG. 9, an optical transmission node device 5 of a fifth exemplary embodiment includes optical amplifiers 101#1 to 101#L, optical amplifiers 102#1 to 102#L, optical splitters 103#1 to 103#L, and wavelength selective switches 104#1 to 104#L. The optical transmission node device 5 also includes wavelength selective switches 211#1 to 211#L, optical amplifiers 212#1#1 to 212#1#R and so on up to 212#L#1 to 211#L#R, and multicast switches 213#1 to 213#R. The optical transmission node device 5 also includes transponders 215#1#1 to 215#1#Q and so on up to 215#R#1 to 215#R#Q. The optical transmission node device 5 also includes transponders 235#1#1 to 235#1#Q and so on up to 235#R#1 to 235#R#Q. The optical transmission node device 5 also includes multicast switches 233#1 to 233#R, optical amplifiers 232#1#1 to 232#1#R and so on up to 232#L#1 to 232#L#R, and couplers 231#1 to 231#L.

At the drop side of the optical transmission node device 5 of the fifth exemplary embodiment, the L individual optical signals output respectively from the L individual optical splitters 103#1 to 103#L are respectively input to the 1-port input/R-port output wavelength selective switches 211#1 to 211#L.

The L individual optical signals input respectively to the wavelength selective switches 211#1 to 211#L are output as R individual optical signals according to their respective wavelengths by the wavelength selective switches 211#1 to 211#L.

The L×R individual optical signals output from the wavelength selective switches 211#1 to 211#L are respectively input to the optical amplifiers 212#1#1 to 212#1#R and so on up to 212#L#1 to 211#L#R, and amplified by the respective optical amplifiers 212#1#1 to 212#1#R and so on up to 212#L#1 to 211#L#R.

The L×R individual optical signals respectively amplified by the optical amplifiers 212#1#1 to 212#1#R and so on up to 212#L#1 to 211#L#R are input to R individual L-port input/Q-port output multicast switches (MCS) 213#1 to 213#R.

The L individual optical signals input respectively to the multicast switches 213#1 to 213#R are switched by the multicast switches 213#1 to 213#R, and respectively output to the Q individual output ports. The optical signals output to the respective Q individual output ports of the multicast switches 213#1 to 213#R are respectively output to the transponders 215#1#1 to 215#1#Q and so on up to 215#R#1 to 215#R#Q.

Note that tunable filters (TF) 214#1#1 to 214#1#Q and so on up to 214#R#1 to 214#R#Q may be inserted between the multicast switches 213#1 to 213#R and the transponders 215#1#1 to 215#1#Q and so on up to 215#R#1 to 215#R#Q.

The R individual L-port input/Q-port output multicast switches are devices for freely switching the L ports on the input side and the Q individual ports on the output side, enabling switching without mutual interference, even for optical signals of the same wavelength. The 1-port input/R-port output wavelength selective switches 211#1 to 211#L are capable of outputting an optical signal of a freely selected wavelength, out of the input optical signals, to a freely selected path in the R×L individual paths. Consequently, at the drop side of the optical transmission node device 5, an optical signal arriving from a freely selected fiber transmission channel out of the optical signals respectively arriving from the fiber transmission channel #1 to #L can be dropped onto a freely selected transponder (directionless). Moreover, an optical signal of a freely selected wavelength can be dropped onto a freely selected transponder (colorless), and switching can be performed without mutual interference even for optical signals of the same wavelength (contentionless).

Moreover, in the present exemplary embodiment, the monitoring and control configuration similar to that of the first exemplary embodiment explained with reference to FIG. 1 may be employed at the output ports of the 1-port input/R-port output wavelength selective switches 211#1 to 211#L. Moreover, the monitoring and control configuration of the second exemplary embodiment explained with reference to FIG. 6, and the monitoring and control configuration of the third exemplary embodiment explained with reference to FIG. 7 may also be employed therefor. Doing so enables optical signal power to be detected for each of the wavelengths, and, using the optical signal powers detected for each of the wavelengths, enables feedback-control to be performed on the variable attenuation amount in the wavelength selective switches 211#1 to 211#L such that the signal optical power of each of the wavelengths becomes a desired value. As a result, power variation between the wavelengths can be suppressed so as to fall within the input power tolerance range of an optical receiver, such as the transponders 215#1#1 to 215#1#Q and so on up to 215#R#1 to 215#R#Q.

Explanation next follows regarding configuration of the add side of the optical transmission node device 5.

The Q×R individual transponders 235#1#1 to 235#1#Q and so on up to 235#R#1 to 235#R#Q are tunable transponders, and can correspond to a freely selected wavelength. This thereby enables optical signals of freely selected wavelengths to be output. The optical signals output from the transponders 235#1#1 to 235#1#Q and so on up to 235#R#1 to 235#R#Q are input to the R individual Q-port input/L-port output multicast switches 233#1 to 233#R.

The Q individual optical signals respectively input to the multicast switches 233#1 to 233#R are switchable by the multicast switches 233#1 to 233#R, and are each output to the L individual output ports. The total L×R individual optical signals output from the respective L individual output ports of the multicast switches 233#1 to 233#R are respectively input to optical amplifiers 232#1#1 to 232#1#R and so on up to 232#L#1 to 232#L#R, and amplified by the respective optical amplifiers 232#1#1 to 232#1#R and so on up to 232#L#1 to 232#L#R.

Note that tunable filters 234#1#1 to 234#1#Q and so on up to 234#R#1 to 234#R#Q may be inserted between the transponders 235#1#1 to 235#1#Q and so on up to 235#R#1 to 235#R#Q and the multicast switches 233#1 to 233#R. The tunable filters 234#1#1 to 234#1#Q and so on up to 234#R#1 to 234#R#Q narrow the bandwidth of optical signals output from the transponders 235#1#1 to 235#1#Q and so on up to 235#R#1 to 235#R#Q.

L×R individual optical signals respectively amplified by the optical amplifiers 232#1#1 to 232#1#R and so on up to 232#L#1 to 232#L#R are input to the L individual R-port input/1-port output couplers 231#1 to 232#L. All of R individual optical signals are coupled together into single optical signals by each of the couplers 231#1 to 232#L.

The optical signals respectively coupled by the couplers 231#1 to 232#L are respectively transmitted to the (L+1)-port input/1-port output wavelength selective switches 104#1 to 104#L.

Then, similarly to in the first exemplary embodiment, the optical signal is output to one of the fiber transmission channels 1 to L.

At the add side of the optical transmission node device 5, only the couplers 231#1 to 231#L, the input side ports, the multicast switches 233#1 to 233#R, and the optical amplifiers 232#1#1 to 232#1#R and so on up to 232#L#1 to 232#L#R are employed. The couplers 231#1 to 231#L are devices that only add power to optical signals. The multicast switches 233#1 to 233#R are devices that freely switch the input side ports and the output side ports. There are no limiting wavelength devices employed on the add side of the optical transmission node device 5. This thereby enables optical signals of freely selected wavelengths to be added from a freely selected transponders 235#1#1 to 235#1#Q and so on up to 235#R#1 to 235#R#Q (colorless). Moreover, optical signals from a freely selected transponders 235#1#1 to 235#1#Q and so on up to 235#R#1 to 235#R#Q can be transmitted to freely selected fiber transmission channels (directionless). Moreover, switching and adding can be accomplished without mutual interference, even for optical signals of the same wavelength (contentionless).

As explained above, according to the technology disclosed herein, an optical add/drop node multiplexer device including colorless and directionless functionality, or an optical add/drop node multiplexer device including colorless, directionless, and contentionless (CDC) functionality is provided. The optical signal intensity of plural output ports of a 1-port input/multiport output wavelength selective switch installed in the device is monitored by an optical channel monitor (OCM), and an optical attenuation amount regulation function in the wavelength selective switch is employed to enable the optical transmission characteristics to be improved.

Although various typical exemplary embodiments have been given, embodiments of the present invention are not limited thereto. The scope of the present invention is accordingly limited only by the scope of the following claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission device comprising:
    a first wavelength selective switch that includes a plurality of output ports, and is disposed at a drop side of the optical transmission device;
    a second wavelength selective switch is disposed at an add side of the optical transmission device;
    an optical switch switches between a first optical signal based on optical signals output respectively from the plurality of output ports of the first wavelength selective switch, and a second optical signal based on an optical signal output from an output port of the second wavelength selective switch, selects a signal from the first optical signal and the second optical signal and outputs the selected optical signal;
    an optical channel monitor monitors optical intensities of the optical signals output from the optical switch; and
    a controller that controls optical intensities of the optical signals from the plurality of output ports of the first wavelength selective switch and an optical intensity of the optical signal from the output port of the second wavelength selective switch respectively, based on the optical intensities monitored by the optical channel monitor device.

2. The optical transmission device of claim 1, wherein the optical channel monitor monitors an optical intensity of each channel.

3. The optical transmission device of claim 1, wherein the optical channel monitor includes a single input port.

4. The optical transmission device of claim 1, further comprising a splitter device that splits optical signals respectively output from the plurality of output ports of the first wavelength selective switch.

5. An optical transmission method comprising:
    switching and outputting, by an optical switch, between optical signals output respectively from a first wavelength selective switch that includes a plurality of output ports and that is disposed at a drop side of an optical transmission device, and an optical signal from an output port of a second wavelength selective switch disposed at an add side of the optical transmission device;

monitoring optical intensities of the optical signals output from the optical switch; and controlling optical intensities of the optical signals from the plurality of output ports of the first wavelength selective switch, and an optical intensity of the optical signal from the output port of the second wavelength selective switch respectively, based on the monitored optical intensities.

\* \* \* \* \*